June 2, 1970

L. E. PERKINS 3,515,210

FILTER APPARATUS FOR WELL TOOL STRING

Filed June 20, 1968

INVENTOR
LEE E. PERKINS

BY Burns, Doane, Benedict, Swecker & Mathis
ATTORNEYS

June 2, 1970  L. E. PERKINS  3,515,210
FILTER APPARATUS FOR WELL TOOL STRING
Filed June 20, 1968  2 Sheets-Sheet 2
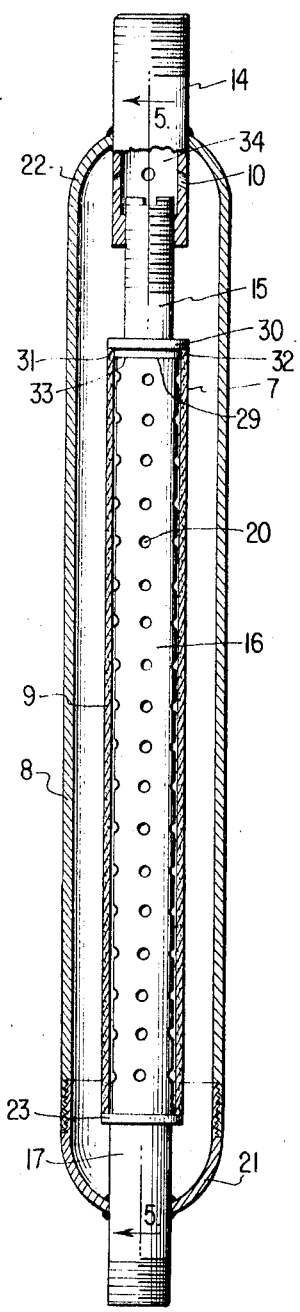
INVENTOR
LEE E. PERKINS
BY Burns, Doane, Benedict, Swecker & Mathis
ATTORNEYS United States Patent Office 3,515,210
Patented June 2, 1970

3,515,210
FILTER APPARATUS FOR WELL TOOL STRING
Lee E. Perkins, Houma, La., assignor to Halliburton Company, Duncan, Okla., a corporation of Delaware
Filed June 20, 1968, Ser. No. 738,459
Int. Cl. E21b 43/08; E03b 3/18
U.S. Cl. 166—205   5 Claims

ABSTRACT OF THE DISCLOSURE

A well tool including a central passage surrounded by an annular passage. A filter is interposed generally radially between the central passage and the annular passage. A flow diverting means is operable to channel flow from the central passage into the annular passage and then back into the central passage through the filter.

GENERAL BACKGROUND, OBJECTS AND SUMMARY OF INVENTION

During certain well treating operations, it is necessary to transmit fluid from a wellhead, downwardly through a conduit string to a formation. For example, during operations involving the consolidation of sand, a resin-containing liquid is pumped downward through a tool string and injected into poorly consolidated sand.

The presence of scale or rust in the interior of the conduit string, as well as other foreign materials, creates the possibility that such foreign materials might be carried along with the fluid being injected. The presence of such foreign materials in the injecting fluid has an ability to deleteriously affect the injection operation. For example, a tubing string which serves to transmit a resin-bearing fluid for sand consolidation purposes may well contain mud residue, undissolved salt, rust, scale or other foreign materials which, if injected into the sand, might have an adverse impact on the sand consolidation operation.

It therefore becomes incumbent to provide a system for effectively filtering out foreign materials from a fluid stream being injected into a formation.

While this desire to eliminate foreign materials is of importance, it is likewise important to provide a generally open passage through the conduit string as the conduit string is being lowered into a well. This open passage is desirable to avoid excessive floating tendency and is also desirable from the standpoint of allowing fluid to be circulated between the conduit string and the well annulus during lowering operations.

Recognizing the need for a generally open conduit string passage during tool string lowering operations, and the need for filtering fluid which is passed downwardly through the fully lowered string, it is an object of the present invention to provide an apparatus which effectively accomplishes each of these goals.

It is likewise an object of the invention to provide a filtering apparatus which is selectively operable from a wellhead and which is characterized by basic simplicity and operational reliability.

It is also an object of the invention to provide such an improved well tool which is characterized by nominal size, and which includes a filtering apparatus which is essentially pressure balanced when exposed to a flow of fluid which tends to press the filter away from a supporting structure.

It is a related object of the invention to provide a relatively small filtering structure for use in a well tool having a general high filtering capacity, nominal size, and both mechanical and hydraulic supporting arrangements which afford maximum structural ruggedness.

It is a still further object of the invention to provide such a well tool which is characterized by ease of assembly and disassembly so as to facilitate the replacement and initial installation of filtering units.

In accomplishing at least some of these objects, there is presented through the invention a tool for injecting fluid into a subterranean formation. This tool comprises, in part, body means and means operable to lower the body means as an entity into a well. A first passage means and a second passage means are both contained within the body means. A filtering means, interposed in a portion of the second passage means, is operable to filter fluid flowing therethrough. A means is provided which is selectively operable from the wellhead of the well to divert fluid, flowing downwardly from the wellhead through the first passage, from the first passage means into the second passage means for transmission through the filtering means.

Related and independently significant facets of the invention entail the aforesaid combination augmented by means, independent of the filtering means, for providing continuous fluid communication between the first passage means and the second passage means. In the context of this combination, additional significance is attached to a tool further including means mounted on first conduit means (defining the first passage means) for selective axial movement relative thereto and operable to secure the filtering means on this first conduit means. This combination further includes selectively detachable coupling means operable to permit simultaneous separation of axially displaced portions of this first conduit means and second conduit means defining the second passage means.

Further significance resides in specific structure by means of which a tubular filtering element is telescopingly mounted on the first conduit means and interposed radially between the first and second passage means.

In describing the invention, reference will be made to preferred embodiments shown in the appended drawings.

In the drawings:

FIG. 1 provides a fragmentary, partially vertically sectioned, view of a well tool with the well tool being supported by a conduit string, and with the conduit string being operable to transmit fluid from a wellhead to the tool for filtering and further transmission to a subterranean formation;

FIG. 2 provides a vertically sectioned and further enlarged view of the FIG. 1 tool illustrating components in a separated position prior to assembly;

FIG. 4 illustrates the components of the FIG. 2 assembly in their full assembled condition;

FIG. 5 provides a still further enlarged, vertically sectioned view of the FIG. 4 assembly illustrating the operation of a diverting valve mechanism which serves to divert flow for filtering purposes; and FIG. 6 illustrates the disposition of the diverting mechanism of the FIG. 5 assembly when this mechanism has been deactivated so as to allow fluid to flow downwardly through a central tool passage without undergoing filtering.

MAJOR COMPONENTS

Figure 1:
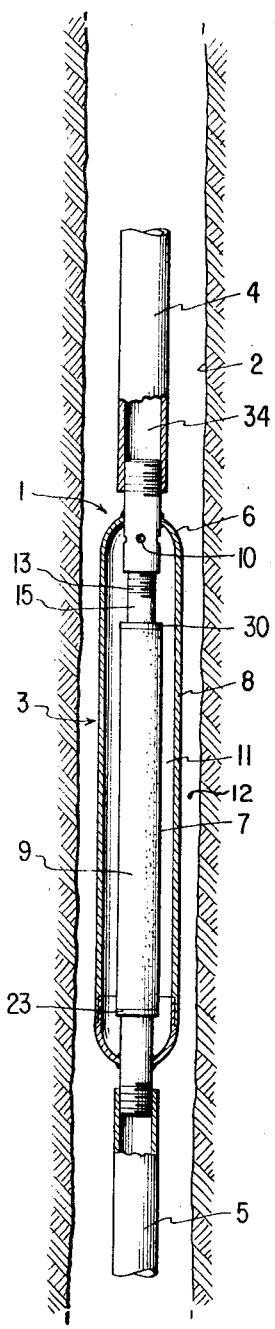

As shown in FIG. 1, a tool string 1 is disposed in a well bore 2. Tool string 1 includes a filtering unit 3 supported on a conduit string 4. Conduit string 4 extends upwardly to a wellhead, not shown. At this wellhead, the conduit string 4 is supported by conventional hoisting equipment for lowering and raising movement through the well bore 2. Additionally, the conduit string 4 is connected through conventional coupling means to a source of pressurized fluid such as a resin-containing liquid.

Fluid which has passed through the filtering unit 3 is transmitted downwardly to a subterranean formation through a lower conduit 5. Conduit 5 may terminate in a perforate "tail pipe" or a conduit section having a valved or unvalved opening. This structure enables the filtered fluid which has passed through the conduit 3 to pass out of the conduit 5 and enter a formation mass, such as poorly consolidated sand.

As its basic components, filtering unit 3 includes body means 6. Conduit 4 provides means operable to lower this body means 6 as an entity into the well 2. First, passage means defining, conduit means 7 extends generally centrally of the body means 6 and interconnectss, in fluid communicating relation, the conduits 4 and 5.

A second passage means defining, conduit means 8 encircles the central conduit 7 and is spaced radially outwardly therefrom. A generally tubular filtering unit 9, is mounted on the inner conduit means 7.

During lowering operations, fluid may flow either downwardly or upwardly through the intercommunicating passages of the conduit means 4, 7 and 5, in a relatively unobstructed fashion. While such central flow takes place, or while fluid even in a stagnant condition occupies the passages of the conduits 4, 7 and 5, pressure equalizing ports 10 provide fluid communication between the first or central passage means defined by the conduit means 4, 7 and 5 and the outer or second passage means 11 defined by the shell 8. As shown in FIG. 1, passage means 11 is generally annular in configuration.

Because of the presence of pressure balancing ports 10, fluid pressure acting on the inside of the filter unit 9 (by way of perforations in the conduit means 7 to be subsequently described) is balanced or substantially offset by fluid pressure transmitted through the ports 10 to the exterior zone 11.

Thus, during lowering operations, fluid may be circulated downwardly through the passage defined by conduit means 4, 7 and 5 and returned to the wellhead by way of the well annulus 12. The presure occasioned by this circulating fluid acts more or less equally on opposite radial sides of the filtering unit 9 so as not to impose excessive stress on this filtering unit.

Once the conduit 4 has been lowered to an extent sufficient to position the lower extremity of the conduit means 5 in proper relation to an injection site, a flow diverting mechanism 13 is operated from a wellhead (in a manner to be subsequently described) so as to cause the fluid flowing downwardly from the wellhead through the conduit 4 to leave the central passage means by way of ports 10 and enter the zone 11. In this connection, it will be understood that this diverting mechanism blocks a central flow of fluid through the portion of the central conduit means 7 supporting the filter unit 9. This diverted fluid passes radially inwardly from the space 11, through the filtering unit 9, and returns to the conduit means 7 for ultimate transmission through the conduit 5 to a subterranean formation.

DETAILS OF BASIC COMPONENTS

The central, or inner conduit means, 7 is defined by a generally tubular conduit 14, an axially adjustable tubular body 15, a perforate conduit section 16, and a terminal, imperforate portion 17 of conduit 16.

Conduit portions 14, 15, 16 and 17, all of which are generally cylindrical in character, are coaxially aligned and operable to provide a generally unobstructed interior passage affording fluid communication between the conduit means 4 and 5.

Conduit section 14 is connected by threaded coupling means 18 to the lower end of conduit means 4. Thus, conduit section 14 provides support means for the filtering unit 3. This support means 14 provides a central passage 19 for supplying fluid to the filtering unit 3, which fluid flows downwardly from the wellhead through the conduit string section 4.

As illustrated, conduit section 16 includes a plurality of generally radially extending openings or ports 20 which communicate with the interior of filter unit 9.

A generally cylindrical shell or conduit-like section 8 encircles, and is radially spaced from, conduit portions 16 and 15, as shown. A first closure means 21 interconnects the lower end of conduit means 7 (i.e. conduit portion 17) with the outer or second conduit means 8. Similarly, a second closure means 22 sealingly interconnects the upper end of conduit means 7 (i.e. unit 14) and the upper end of outer conduit shell 8.

With this arrangement, conduit 14 serves to supply unfiltered fluid to the filtering unit 3, while conduit unit 17 serves to discharge filtered fluid out of the unit 3.

As shown in FIG. 4, filtering unit 9 comprises a cylindrical shell. This shell may be fabricated, for example, of sintered bronze. In one embodiment, shown generally to scale, the conduit wall 8 has an outer diameter of approximately 5 inches, with the filter unit 9 having an outer diameter of approximately 3 inches, and an inner diameter of approximately 2.875 inches. The axial length of the filtering unit 9, in this embodiment, is approximately 28 inches. The filtering unit 9 may be fabricated of bronze particles having a size on the order of 50 microns.

The tubular filtering means 9, as shown in FIGURE 4, is telescopingly mounted over the conduit portion 16. A generally annular stop 23 abuttingly engages the lower end 24 of the filter body 9, so as to prevent downward movement of the filter body 9 on the perforate conduit portion 16.

Conduit portion 15 defines securing means operable to secure the filtering unit 9 on the inner conduit 16.

This securing means 15 comprises a generally tubular body portion 25. Tubular body portion 25 includes a threaded exterior portion 26 which is threadedly engaged with a threaded aperture 27 in the lower end of supply conduit 14. A slot means 28 is formed in the upper end of threaded portion 26 and is engageable with a tool. By rotating this tool, the body portion 25 is selectively moved axially of the conduit means 7, either toward or away from the upper or free end 29 of the perforate conduit portion 16.

A clamping means 30, carried by the lower end of the body portion 25, is operable to exert axial restraint on the upper end 32 of the filtering means so as to prevent the filtering unit from moving upwardly on the perforate conduit portion 16. This clamping means includes a first annular ledge 31 operable to clampingly and generally sealingly engage the upper end 32 to the filtering unit 9. Clamping means 30 also includes an inner ledge 33 which engages, in a more or less sealing fashion, the free end 29 of the perforate conduit 9.

With clamping means 30 thus engaged with the filtering unit 9 and the inner conduit 16, a substantially continuous conduit means 7 is provided extending from the conduit 14 through the conduit 17.

With this conduit means 7 thus defined, the port means 10 intersect the supply conduit 14 and provide fluid communication between the first passage means 34 of conduit means 7 and the annular or second passage means 11.

As illustrated, filtering unit 9 is interposed generally radially between the annular passage 11 and the central passage 34, with ports 20 providing fluid communication between the passage 34 and the interior side of the filtering unit 9.

Flow diverting mechanism 13 includes a valve mechanism 35, shown in FIGS. 5 and 6. Valve mechanism 35 is operable from the well-head to divert flow from the central passage 34 into the annular passage 11.

This valving mechanism 35 comprises a generally annular valve seat 36. Valve seat 36 is secured in a first position within tubular body 25 by means of frangible set screws 37.

In this first position, the valve seat 36 is supported above a second position defined by a crossbar 38. Crossbar 38 extends along a diameter of tubular body 25 and across a central portion of passage means 34 so as to offer minimum impedance to fluid flow.

A spacer rod 39 is mounted on bar 38 and projects coaxially of the longitudinal passage 34 so as to be coaxially aligned with the aperture 40 of valve seat 36.

With valve seat 36 supported in the above-described first position, and with a ball valve 41 sealingly positioned on the frustoconical seat surface 42 of seat body 36, the upper end of the spacer rod 39 is spaced beneath the ball 41.

When sufficient fluid pressure acts on the assembled seat 36 and valve 41, the frangible means 37 are broken so as to enable the seat 36 to move downwardly to the second rest position defined by engagement of the seat 36 with the bar 38. In this second position, as shown in FIG. 6, the spacer rod 39 is operable to hold the ball 41 spaced from the seat surface 42. With the seat 36 disposed in this second position, fluid may flow in a relatively unobstructed fashion through the central passage 34.

First coupling means 21 includes a generally hemispherical portion 43 which projects generally outwardly from the conduit portion 17. Hemispherical portion 43 is welded at its lower end 44 to the outer periphery of conduit 17.

The upper end of hemispherical portion 43 tangentially merges with a cylindrical and externally threaded coupling portion 45. Coupling portion 45 is detachably and threadedly engaged with an internally threaded, generally cylindrical coupling portion 46 formed at the lower end of cylindrical shell 8.

Somewhat similarly, coupling or sealing means 22 comprises a hemispherical shell 47. Shell 47, at its upper end 48, is welded to the exterior of conduit 14. At its lower end, shell 47 tangentially merges with the cylindrical conduit portion 8.

MODE OF ASSEMBLY OF COMPONENTS

Figure 2:
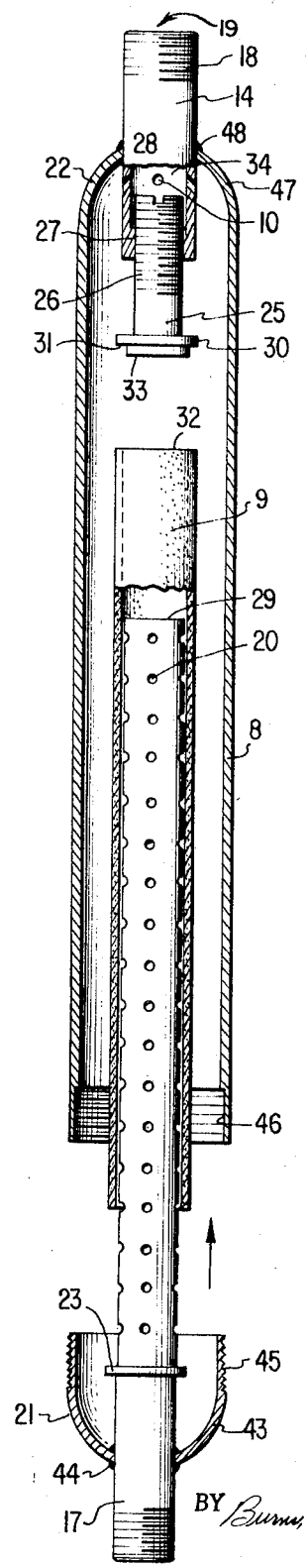
Figure 3:
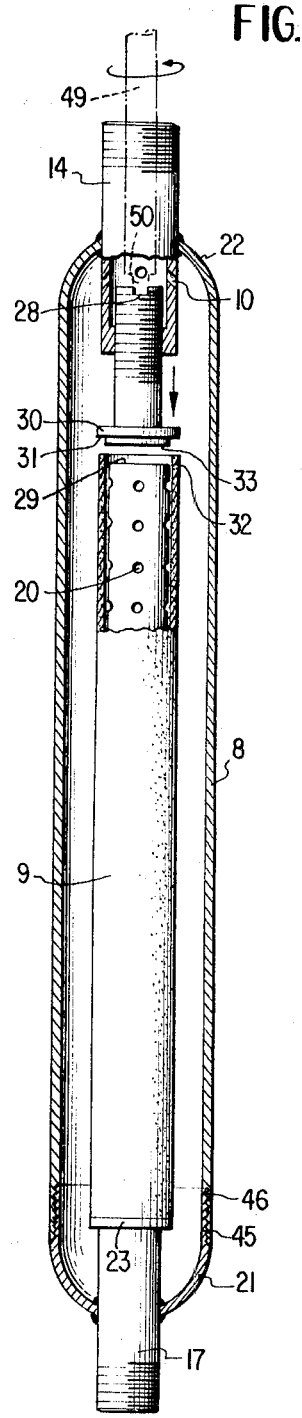
FIG. 3 illustrates the components shown in FIG. 2 as a portion of the assembly of the tool has been completed and as a clamping mechanism is being manipulated to secure a tubular filtering arrangement on a perforate supporting conduit.

FIGS. 2, 3 and 4 illustrate the manner in which the principal components of the filtering unit 3 are assembled.

As shown in FIG. 2, assembly commences with the coupling portion 45 detached from the coupling portion 46 so as to expose the free or upper end 29 of the perforate conduit 16. With the conduit end 29 thus exposed, the filtering sleeve 9 may be telescoped over the upper end 29 of the conduit 16 and brought to rest against the lower stop 23. Because of space considerations, FIG. 2 illustrates the sleeve 9 partially assembled on the conduit 26, while the sleeve 9 and conduit 16 are partially inserted into the interior or shell 8. It will be understood that this assembly would ordinarily occur with the filtering unit 9 and conduit 16 completely outside of the shell 8. This assembly is facilitated by the axially displaced nature of connecting means 30 and 45, i.e., conduit 16 is fully accessible for the installation of sleeve 9.

With the sleeve 9 mounted on the conduit 16 and engaged with the stop 23, the coupling parts 45 and 46 may be threadedly engaged to join the components in the arrangement shown in FIG. 3.

With the components in this FIG. 3 position, the clamping means 30 (if previously raised) may be lowered. This lowering may be effected by inserting a tool 49 into the interior of supply conduit 14 so as to cause a crossbar 50 to engage the slot 28. By rotating the rod 49 in an appropriate direction, the crossbar 50 will induce rotation of the threaded coupling portion 26 so as to cause the clamping means 30 to move downwardly and engage the upper ends of the filtering unit 9 and the conduit 16. This mode of engagement is shown, for example, in FIG. 5.

As will be appreciated, the underside of annular flanges 31 and 33 may be provided with elastomeric gaskets to promote efficient and simultaneous sealing between the conduit 16 and filtering unit 9 and the clamping means 30.

MODE OF OPERATION

With the components of filtering unit 3 thus assembled, the unit 3 may be interconnected with conduit portions 4 and 5 and the entire tool string then lowered into the well 2. During lowering, with there being no ball 41 within the filtering unit 3, fluid may flow relatively freely either upwardly or downwardly through the central passage 34.

Thus, if desired, fluid may be circulated downwardly through the passage 34 and out of the tool lower end and then upwardly through the annulus 12 during the tool lowering operation.

Once the tool has been properly positioned within the well 2, the ball 41 may be dropped from the wellhead through the conduit 4. This ball will come to rest on the seat surface 42 so as to block the passage 34 between the conduit unit 16 and the ports 10. With central passage 34 thus blocked, fluid will be diverted from the passage 34, through the ports 10, and into the annulus passage 11. Fluid will then flow from the passage 11 through the filter 9 and perforations 20 back into the interior passage 34, beneath the flow diverting valve mechanism 35.

In the event that the filtering unit should become excessively clogged during an injection operation, it may be appropriate to continue further injections without the filtering. This may be accomplished by building up the pressure of fluid within the passage 34 to a level sufficient to induce shearing of the frangible holding means 37. This pressure build up may be effected by using surface pumps in a conventional and well known manner. This pressure building up will occur because the filtering means 9 is clogged and thus fluid is unable to flow at an adequate rate through the passage means 11 and back into the central passage 34.

When the pressure within conduit means 34 has been built up to a predetermined level, the securing means 37 will rupture and the seat 42 will move downwardly toward the stop bar 38. The lowermost position of the detached seat 42 is determined by the stop bar 38.

With seat 42 thus removed from its first position, the spacer rod 39 is operable to hold the ball valve 41 out of sealing engagement with the seat surface 42. In this fashion, a central flow path is restored so that fluid may flow through the passage means 34 from the conduit 4 to the conduit 5.

It is here significant to note that, as fluid is flowing downwardly through the passage 34, either during the lowering operation or after the seat 42 has been displaced downwardly, high pressure fluid within the passage 34 acting on the inside of the filter 9 will be offset or substantially balanced by fluid pressure transmitted through the ports 10 to the zone 11.

MAJOR ADVANTAGES AND SCOPE OF INVENTION

A principal advantage of the invention resides in the ability of the apparatus to permit either filtered or unfiltered fluid flow through a well tool which is to be lowered through a well bore for fluid injection purposes.

Another principal advantage resides in the pressure balancing feature which provides effective peripheral support for the relatively thin walled filter unit 9 when pressure acts on the filter unit 9 so as to tend to move the filter wall radially outwardly from the supporting conduit 16.

The overall structure of the tool is such as to provide dimensional compactness, consistent with a large filtering area.

The manner in which the apparatus may be separated and reassembled contributes to ease of filter replacement under field conditions.

The axially elongated and cylindrical nature of the filtering unit, coupled with the coaxial relationships between the central and annular flow passages, enables a high degree of filtering action to be effected within a relatively small tool cross section.

Of course a major advantage resides in an operator being able to filter out undesired materials from a fluid being injected into a formation so as to improve the efficiency of the overall injecting operation.

In describing the invention, reference has been made to a preferred embodiment. However, those skilled in the fluid injection art and familiar with the disclosure of the invention may envision additions, deletions, substitutions or other modifications which would fall within the purview of the invention as set forth in the appended claims.

I claim:

1. A tool for injecting fluid into a subterranean formation comprising:
a body means;
means operable to lower said body means as an entity into a well;
first passage means contained within said body means;
second passage means contained within said body means;
means providing for relatively unobstructed flow of fluid through said first passage means in both upward and downward directions during lowering of said body means as an entity into said well;
filtering means interposed in a portion of said second passage means and operable to filter fluid flowing therethrough; and
means selectively operable from a well head of said well to divert fluid, flowing downwardly from said wellhead through said first passage means, from said first passage means into said second passage means for transmission through said filtering means, 2. A tool for injecting fluid into a subterranean formation comprising:
body means;
means operable to lower said body means as an entity through a well;
first relatively open passage means extending longitudinally of and contained within said body means;
second, generally annular passage means extending generally longitudinally of and contained within said body means, with said first passage means passing longitudinally through said second passage means;
means providing for relatively unobstructed flow of fluid through said first passage means in both upward and downward directions during lowering of said body means as an entity in said well;
generally annular filtering means encircling and communicating with said first passage means and interposed in a portion of said second passage means;
means selectively operable from a wellhead of said well to divert fluid, flowing downwardly from said well head through said first passage means, from said first passage means into said second passage means for transmission through said filtering means and return to said first passage means; and
means independent of said filtering means providing continuous fluid communication between said first passage means and said second passage means.

3. A tool for injecting fluid into a subterranean formation comprising:
body means;
means operable to lower said body means as an entity through a well;
first relatively open conduit means extending longitudinally of and contained within said body means;
second, generally annular, conduit means extending generally longitudinally of and defining the exterior of said body means, with said first conduit means passing longitudinally through said second conduit means;
means providing for relatively unobstructed flow of fluid through said first conduit means in both upward and downward directions during lowering of said body means as an entity into said well;
generally annular filtering means interposed generally radially between said first conduit means and said second conduit means;
means selectively operable from a wellhead of said well to divert fluid, flowing downwardly from said wellhead through said first conduit means, from said first conduit means into said second conduit means for transmission through said filtering means and return to said first conduit means;
means independent of said filtering means providing continuous fluid communication between said first conduit means and said second conduit means;
means mounted on said first conduit means for selective axial movement relative thereto and operable to secure said filtering means on said first conduit means, and
selectively detachable coupling means operable to permit simultaneous separation of axially displaced portions of said first and second conduit means.

4. A tool for injecting fluid into a subterranean formation comprising:
support means providing a supply passage operable to supply fluid flowing downwardly through a well from a wellhead;
outer conduit means;
perforate inner conduit means including a plurality of openings extending generally laterally of a longitudinal axis of said inner conduit means;
first closure means connecting and mutually sealing one end of said inner conduit means and one end of said outer conduit means, with said inner conduit means being disposed within and spaced from said outer conduit means;
said one end of said inner conduit means defining a fluid discharging passage;
generally tubular filtering means;
said filtering means being telescopingly mounted on said inner conduit means;
stop means operable to limit axial movement of one end of said filtering means in one direction on said inner conduit means;
second closure means connecting and mutually sealing said support means and said outer conduit means;
securing means operable to secure said filtering means on said inner conduit means, said securing means including:
tubular body means,
means mounting said tubular body means on said support means for selective movement toward or away from a free end of said inner conduit means generally opposite to said one end of said inner conduit means, and
clamping means carried by said tubular body means and operable to exert axial restraint on another end of said filtering means, generally opposite to said one end of said filtering means, to restrain axial movement of said filtering means in a direction opposite to said one direction,
said support means, tubular body means, and inner conduit means defining first passage means, including said supply passage and discharge passage, extending axially of said outer conduit means and spaced radially inwardly of said outer conduit means;
means providing fluid communication between said first passage means and a space between said first passage means and said outer conduit means, with said filtering means being interposed between said space and said discharge passage, and with said space defining second passage means interposed between said filtering means and said supply passage; and
selectively operable valve means in said first passage means and operable to divert flow from said first passage means to said space.

5. A tool as described in claim 4:
wherein said first closure means comprises:
- generally hemispherical wall means projecting generally outwardly of said inner conduit means,
- generally cylindrical, first threaded coupling means connected with said generally hemispherical wall means, and
- second generally cylindrical threaded coupling means detachably and threadably engageable with said first threaded coupling means and carried by said outer conduit means;

wherein said filtering means comprises a generally tubular body of sintered material;

wherein each of said support means, outer conduit means and inner conduit means is substantially cylindrical, wherein said clamping means comprises:
- first annular ledge means operable to engage said other end of said filtering means, and
- second annular ledge means operable to engage said free end of said inner conduit means; and wherein said valve means comprises:
- generally annular ball valve, seat means contained within said tubular body means,
- frangible means detachably securing said seat means at a first location within said tubular body means,
- stop means operable to position said seat means at a second position within said tubular body means spaced from said first position, subsequent to the release of said seat means from said frangible means, and
- spacer means operable at said second position to space a ball valve from said seat means, said spacer means being spaced from said ball valve when said ball valve is seated on said seat means in said first location.

References Cited
UNITED STATES PATENTS

| | | | |
|---|---|---|---|
| 2,793,752 | 5/1957 | Jay | 210—448 X |
| 2,963,163 | 12/1960 | Veres | 210—510 X |
| 3,033,783 | 5/1962 | Lubben | 210—510 |
| 3,314,481 | 4/1967 | Willman et al. | 166—228 X |
| 3,355,021 | 11/1967 | Jones | 210—446 X |
| 3,369,665 | 2/1968 | Paulson | 210—448 X |

DAVID H. BROWN, Primary Examiner

U.S. Cl. X.R.

166—236; 210—446